(12) United States Patent
    Pestov

(10) Patent No.: US 10,997,785 B2
(45) Date of Patent: May 4, 2021

(54) SYSTEM AND METHOD FOR COLLECTING GEOSPATIAL OBJECT DATA WITH MEDIATED REALITY

(71) Applicant: VGIS INC., Toronto (CA)

(72) Inventor: Alexandre Pestov, Toronto (CA)

(73) Assignee: VGIS INC., Toronto (CA)

( * ) Notice: Subject to any disclaimer, the term of this patent is extended or adjusted under 35 U.S.C. 154(b) by 0 days.

(21) Appl. No.: 16/583,724

(22) Filed: Sep. 26, 2019

(65) Prior Publication Data

US 2021/0097760 A1   Apr. 1, 2021

(51) Int. Cl.

| | | |
|---|---|---|
| *G06T 17/05* | (2011.01) | |
| *G01C 15/06* | (2006.01) | |
| *G06F 16/387* | (2019.01) | |
| *G06K 9/00* | (2006.01) | |
| *G06T 7/70* | (2017.01) | |
| *G06T 19/00* | (2011.01) | |
| *G06F 16/58* | (2019.01) | |

(52) U.S. Cl.
    CPC ............. *G06T 17/05* (2013.01); *G01C 15/06* (2013.01); *G06F 16/387* (2019.01); *G06F 16/5866* (2019.01); *G06K 9/00671* (2013.01); *G06T 7/70* (2017.01); *G06T 19/006* (2013.01)

(58) Field of Classification Search
    None
    See application file for complete search history.

(56) References Cited

U.S. PATENT DOCUMENTS

| | | | | |
|---|---|---|---|---|
| 2014/0306866 A1* | 10/2014 | Miller | ...................... | G06K 9/38 345/8 |
| 2016/0196687 A1* | 7/2016 | Alpert | ..................... | G06T 17/05 345/419 |

* cited by examiner

*Primary Examiner* — Said Broome
(74) *Attorney, Agent, or Firm* — Bhole IP Law; Anil Bhole; Marc Lampert

(57) ABSTRACT

There is provided a system and method of collecting geospatial object data with mediated reality. The method including: receiving a determined physical position; receiving a live view of a physical scene; receiving a geospatial object to be collected; presenting a visual representation of the geospatial object to a user with the physical scene; receiving a placement of the visual representation relative to the physical scene; and recording the position of the visual representation anchored into a physical position in the physical scene using the determined physical position.

15 Claims, 7 Drawing Sheets

SYSTEM AND METHOD FOR COLLECTING GEOSPATIAL OBJECT DATA WITH MEDIATED REALITY

TECHNICAL FIELD

The following relates generally to geospatial data management; and more particularly, to systems and methods for collecting geospatial object data with mediated reality.

BACKGROUND

Surveying firms, mapping firms, municipalities, public utilities, and many other entities, collect, store, use, and disseminate vast amounts of geospatial data. This geospatial data can be used to manage daily operations and conduct mission-critical tasks; for example, asset maintenance, construction plan design, zoning proposals, among many others. Traditionally, geospatial data is collected using manual measurements (offsets) from detectable local landscape features; for example, a curb line. Then the collected measurements would be plotted on a map to indicate object/asset locations. The maps could then be reprinted for use in the field. While much of this geospatial data can be digitized, the accuracy and quality of such digital representations may affect the tasks and applications that rely on such data. In other approaches, location tools, such as global navigation satellite systems (GNSS) and/or real-time kinematic (RTK), can be used to collect digital geospatial data. These approaches generally require cumbersome, unsophisticated, and time-consuming validation techniques.

SUMMARY

In an aspect, there is provided a computer-implemented method of collecting geospatial object data with mediated reality, the method comprising: receiving a determined physical position; receiving a geospatial object to be collected; presenting a visual representation of the geospatial object to a user relative to a physical scene; receiving a placement of the visual representation relative to the physical scene; and recording the position of the visual representation anchored into a physical position in the physical scene using the determined physical position.

In a particular case of the method, the determined physical position comprises latitude, longitude, elevation, and bearing.

In another case of the method, the physical position is received from at least one of global navigation satellite systems (GNSS) and real-time kinematic (RTK) positioning.

In yet another case of the method, the physical position is determined using at least one of manual calibration, vGIS calibration, and markers.

In yet another case of the method, the physical scene comprises a counterpart geospatial object to the geospatial object, and wherein receiving placement of the visual representation comprises placing the visual representation at a location of the counterpart geospatial object in the physical scene.

In yet another case of the method, receiving a placement of the visual representation comprises receiving one or more inputs from a user each representing at least one of moving the visual representation, rotating the visual representation, tilting the visual representation, and sizing the visual representation.

In yet another case of the method, placing the visual representation at the location of the counterpart geospatial object in the physical scene comprises using machine vision and artificial intelligence techniques to locate the counterpart geospatial object in the physical scene and place the visual representation at such location.

In yet another case of the method, recording the position of the visual representation anchored into the physical position in the physical scene comprises using the latitude, the longitude, and the elevation of the determined physical position, a determined azimuth, and a distance to a geospatial object in the physical scene.

In yet another case of the method, the distance to the geospatial object in the physical scene comprises receiving a distance measurement from a distance finder device.

In yet another case of the method, using the latitude, the longitude, and the elevation of the determined physical position comprises capture metadata from global navigation satellite systems (GNSS) and correcting the difference in distance between the GNSS data and the position of the visual representation.

In yet another case of the method, recording the position of the visual representation anchored into the physical position in the physical scene further comprises recording at least one of the size, height, and orientation of the visual representation of the geospatial object.

In another aspect, there is provided a system of collecting geospatial object data with mediated reality, the system comprising one or more processors and data storage memory in communication with the one or more processors, the one or more processors configured to execute: a position module to receive a determined physical position; an object module to receive a geospatial object to be collected; a display module to present, to a display device, a visual representation of the geospatial object relative to a physical scene; a placement module to receive a placement of the visual representation relative to the physical scene; and a recordation module to record the position of the visual representation anchored into a physical position in the physical scene using the determined physical position.

In a particular case of the system, the determined physical position comprises latitude, longitude, elevation, and bearing.

In another case of the system, the physical position is received from at least one of global navigation satellite systems (GNSS) and real-time kinematic (RTK) positioning.

In yet another case of the system, the physical scene comprises a counterpart geospatial object to the geospatial object, and wherein receiving placement of the visual representation comprises placing the visual representation at a location of the counterpart geospatial object in the physical scene.

In yet another case of the system, receiving a placement of the visual representation comprises receiving one or more inputs from a user from an input device, where each input represents at least one of moving the visual representation, rotating the visual representation, tilting the visual representation, and sizing the visual representation.

In yet another case of the system, placing the visual representation at the location of the counterpart geospatial object in the physical scene comprises using machine vision and artificial intelligence techniques to locate the counterpart geospatial object in the physical scene and place the visual representation at such location.

In yet another case of the system, recording the position of the visual representation anchored into the physical position in the physical scene comprises using the latitude, the longitude, and the elevation of the determined physical position, a determined azimuth, and a distance to a geospatial object in the physical scene.

In yet another case of the system, the distance to the geospatial object in the physical scene comprises receiving a distance measurement from a distance finder device.

In yet another case of the system, using the latitude, the longitude, and the elevation of the determined physical position comprises capture metadata from global navigation satellite systems (GNSS) and correcting the difference in distance between the GNSS data and the position of the visual representation.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
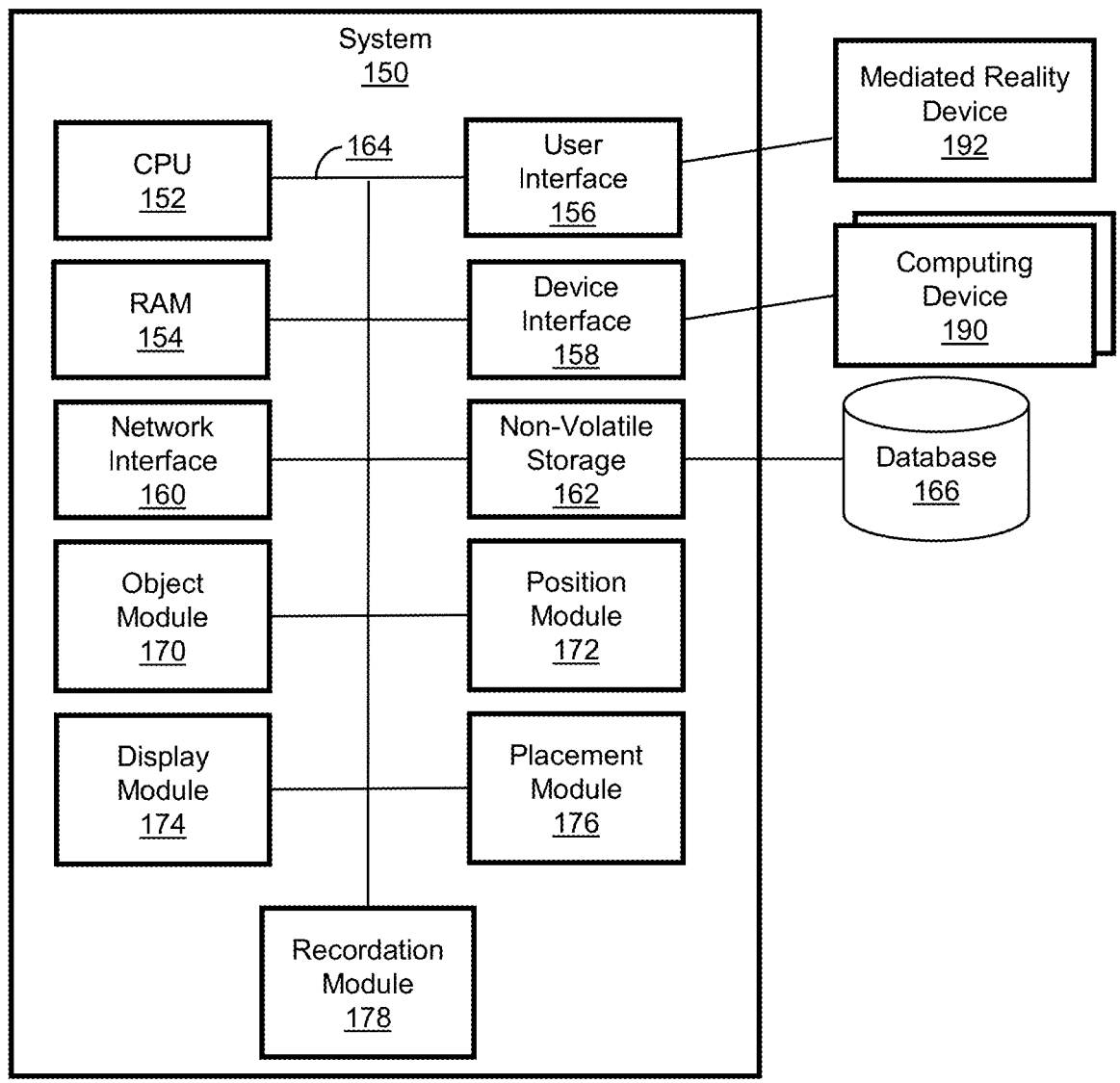
FIG. 1 illustrates a block diagram of a system of collecting geospatial object data with mediated reality, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

The following relates generally to geospatial data management; and more particularly, to systems and methods for collecting geospatial object data with mediated reality.

While the following disclosure refers to mediated reality, it is contemplated that this includes any suitable mixture of virtual aspects and real aspects; for example, augmented reality (AR), mixed reality, modulated reality, holograms, and the like. The mediated reality techniques described herein can utilize any suitable hardware; for example, smartphones, tablets, mixed reality devices (for example, Microsoft™ HoloLens™), true holographic systems, purpose-built hardware, and the like.

Figure 3A:
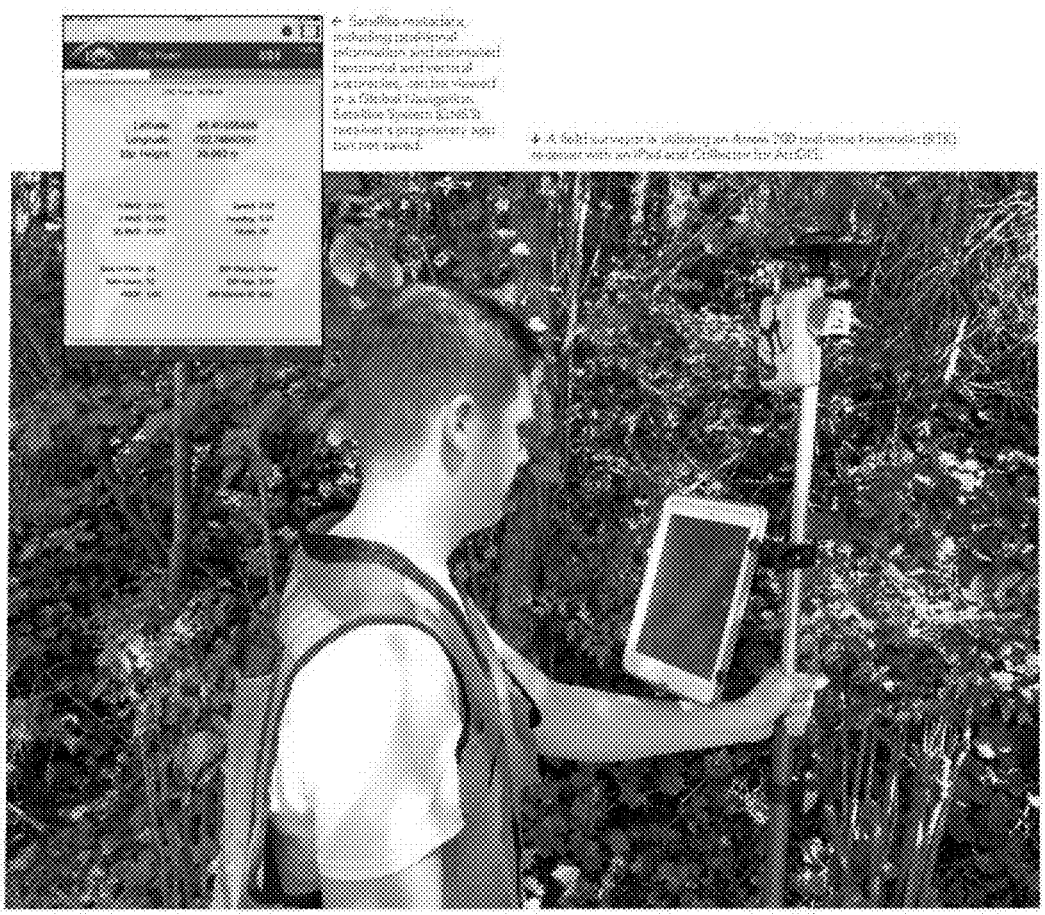
FIG. 3A illustrates an exemplary image of collecting geospatial data by placing an antenna.
Figure 3B:
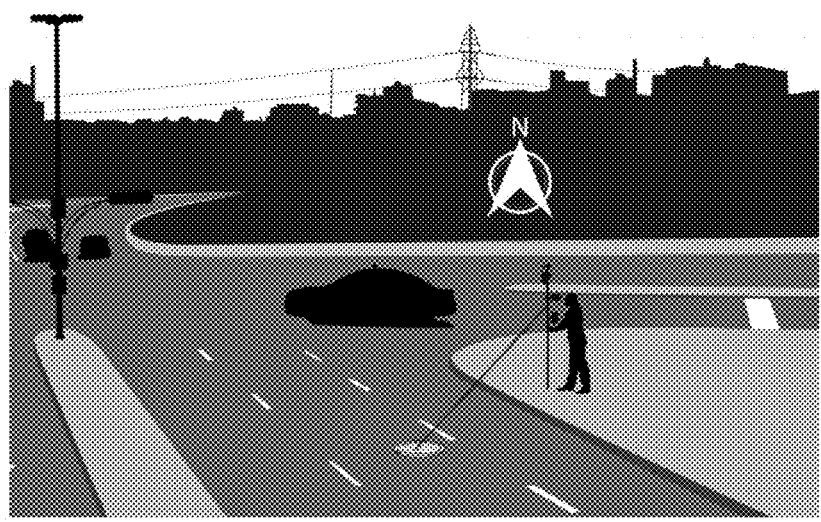
FIG. 3B illustrates an exemplary diagram of collecting geospatial data by placing an antenna.

With the rise of mobile computing, geographic information systems (GIS) using high-precision global navigation satellite systems (GNSS) and/or real-time kinematic (RTK) positioning, can be used to digitize data collection of geospatial data. As illustrated in the example of FIGS. 3A and 3B, certain computer-implemented approaches allow the collection of geospatial data by placing a GNSS antenna near or on top of a placemark and then recording, for example, latitude, longitude and elevation of the antenna; thus, the 'x, y, z' geospatial coordinates of the placemark in two-dimensional (2D) or three-dimensional (3D) space. In some cases, complimentary tools, for example laser mapping, can further enhance collection by allowing collection of data of hard-to-reach objects.

Captured geospatial data can be displayed on a 2D map to help a technician, or other user, validate accuracy of the data.

In some cases, the elevation data and other attributes of the object can be stored as part of the captured geospatial data metadata in text format.

Although mobile computing with GNSS and/or RTK can provide high-accuracy (for example, up to one centimeter) digital geospatial data collection, a substantial drawback of some approaches is the lack of sophisticated visual feedback. This lack of visual feedback means that it is reliant on multiple hardware components and a technician's skills to interpret readings from multiple gauges to ensure collected data's accuracy. Thus, these approaches can be heavily reliant on non-visual representations that require dubious models of the collected information to validate data quality.

Advantageously, the present embodiments can use advanced visualization technologies to implement data collection based on high-accuracy visual placement of geospatial objects using augmented or mixed realities. The present embodiments can apply the described approaches to speed up and enhance the data gathering processes with real-time visual representations using mediated reality; for example, augmented reality, mixed reality, or holograms.

Embodiments of the present disclosure can generate a geospatial image that is embedded in an image of a scene captured by a camera (for example, as in augmented reality) or displayed as a hologram (for example, as in mixed reality or holographic systems). This can be performed in a manner that anchors to reality through geographical positioning, thereby generating a geographically relevant composite image or a hologram that can be presented to a user.

Embodiments of the present disclosure can advantageously provide a three-dimensional model or a raster symbol of real time data viewable, for example, on mobile devices, wearable devices, or other viewing platforms. The geospatial images can be used to provide real-time visual representations to perform geospatial data collection and/or validate accuracy of geospatial data through visual feedback.

Turning to FIG. 1, a system of collecting geospatial object data with mediated reality 150 is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, mixed reality devices such as Microsoft™ HoloLens™ true holographic systems, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 also outputs information to output devices; for example, a mediated reality device 192, a display or multiple displays, a holographic visualization unit, and the like. The mediated reality device 192 can include any device suitable for displaying augmented or mixed reality visuals; for example, smartphones, tablets, holographic goggles, purpose-built hardware, or other devices. The mediated reality device 192 may include other output sources, such as speakers. In some cases, the system 150 can be collocated or part of the mediated reality device 192. In some cases, the user interface 156 can have the input device and the output device be the same device (for example, via a touchscreen). The device interface 158 can communicate with one or more other computing devices 190 that are either internal or external to the system 150; for example, a GNSS device to capture a position and/or elevation, a camera or camera array to capture image(s) of a scene, sensors for determining position and/or orientation (for example, time-of-flight sensors, compass, depth sensors, spatial sensors, inertial measurement unit (IMU), and the like). In some cases, at least some of the computing devices 190 can be collocated or part of the mediated reality device 192. In further embodiments, the device interface 158 can retrieve data from other devices, such as positions, elevations, and images, which have been previously captured, from the local database 166 or a remote database via the network interface 160.

The network interface 160 permits communication with other systems, such as other computing devices and servers remotely located from the system 150. Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of modules to be executed on the one or more processors 152, including an object module 170, a position module 172, a display module 174, a placement module 176, and a recordation module 184.

In an embodiment, the object module 170 can have access to library of objects designated for data collection. The library of objects can be stored locally on the database 166 or as part of a remote GIS system via the network interface 160.

Figure 2:
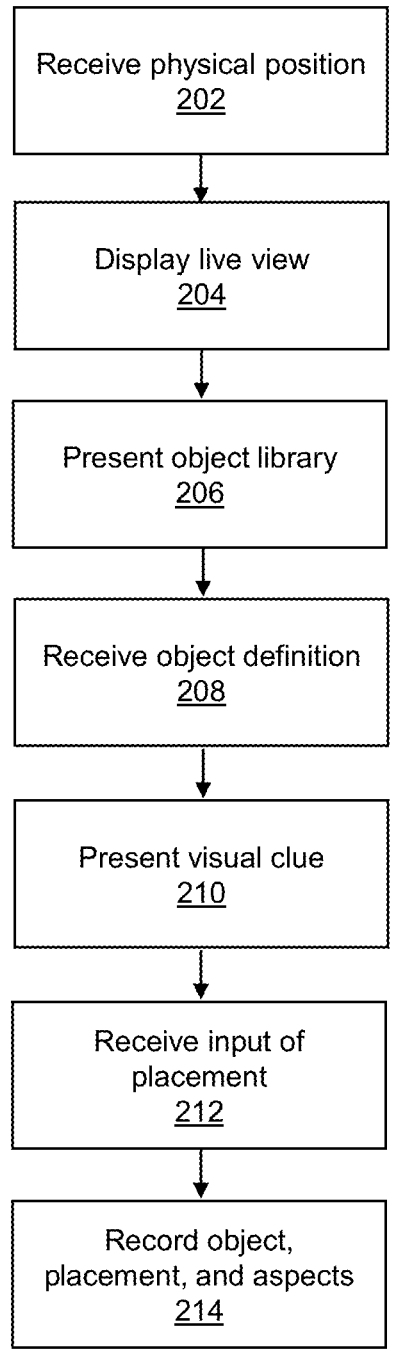
FIG. 2 illustrates a flow diagram of a method of collecting geospatial object data with mediated reality, according to an embodiment.

Turning to FIG. 2, a flowchart for a method of collecting geospatial object data with mediated reality 200 is shown, according to an embodiment.

At block 202, the position module 172 receives or determines a physical position of the system 150 from a spatial sensor type computing device 190; where the physical position includes geographical coordinates. In most cases, the geographical coordinates are relative to the surface of the earth, for example latitude and longitude. In other cases, the geographical coordinates can be relative to another object; for example, relative to a building or landmark. In some cases, the physical position includes an elevation. In some cases, the position module 172 also receives or determines an orientation or bearing of the system 100; for example, comprising the physical orientation of the direction of the camera. In an example, the position module 172 can determine the position and orientation in 2D or 3D space (latitude, longitude, and, in some cases, elevation) using internal or external spatial sensors and positioning frameworks; for example, GNSS and/or RTK, Wi-Fi positioning system (WPS), manual calibration, vGIS calibration, markers, and/ or other approaches. The position module 172 can then track the position and/or the orientation during operation of the system 150. In some cases, machine vision combined with distance finders can be used to determine position, for example, using triangulation. In some cases, distance can be determined, for example, by using a built-in or external range finder spatial sensor directed to the object. In some cases, distance can be determined by a spatial sensor by capturing several images of the scene and comparing pixel shift. In some cases, distance can be determined using time-of-flight (TOF) spatial sensors. In some cases, beacon-based positioning can be used; for example, using iBeacon™.

At block 204, the display module 174 displays a mediated reality 'live' view (such as a video stream or a sequential stream of captured images) received from a camera. This live view is oriented in the direction of the system 150 as received by the position module 172 in block 202. In embodiments using holographic devices, in some cases, receiving the 'live view' can be omitted because the visual representation itself is displayed in the physical space.

Figure 4:
FIG. 4 illustrates an example screenshot of selection of an object, in accordance with the system of FIG. 1.

At block 206, the object module 170 presents at least a subset of the library of objects to a user. The object module 170 can utilize an internal library of geospatial object definitions, an external library of geospatial object definitions, or a library of geospatial object definitions defined by the user. In some cases, the user can provide input to create or edit object definitions. An example screenshot of such a presentation is shown in FIG. 4. In some cases, object definitions be generated automatically based on one or many dynamic factors. The object definition can have associated therewith attributes of the object; for example, geometry type, 2D or 3D model parameters, the object type (for example, hydrant or manhole), object condition, colour, shape, and other parameters. In other cases, the object can be defined as a simple point, line, or area, without any additional attributes. In some cases, for example where the system 150 is configured to collect data of objects of a single type, then the object selection at block 206 can be by-passed as the object type can be automatically selected.

At block 208, the object module 170 receives an object definition. In a particular case, receiving the object definition can include receiving a selection from the user with respect to an object the user would like to collect. In this way, as described, the system 150 can produce and render visual representations (for example, three-dimensional geospatial models) directly to the user. In further cases, the object and the object definition (metadata) can be passed to the object module 170 from an external application to enable data collection for objects that are not stored in the library (for example, using dynamic data definition). An example screenshot of a selection is also shown in FIG. 4, whereby the user has selected the "ssManhole" object. In further cases, the selected object can be received from an external software source or via a hyperlink.

In further cases, the object module 170 can determine the object definition automatically via machine vision analysis of one or more physical objects in the captured scene. As an example, a machine vision algorithm can determine that the camera is capturing a hydrant that is red and 1.1 m tall; which forms the object definition. As described herein, this automatically-generated object definition can be used by the display module 174 to a visual representation of the example hydrant. In another example, the object module 170 can determine a point (or a cross or a bulls-eye) at a location of a utility pole base. In this example, the object definition can be a point (or cross or bulls-eye) of that location.

In an example embodiment, a machine vision model can be sued to identify the object in the captured scene, and then identify an aspect of the object; for example, a closest point of the object or a center of the object. The position module 172 can determine a distance to that aspect; for example, using a distance finder. In some cases, machine vision can also be used to identify properties of the object, as described herein.

In some cases, the object library can be integrated with external systems, such that the object module 170 can receive one or more object definitions from these external systems. The format of the objects in the library can include GeoJSON or other protocols. In an example external integration arrangement, the external system crafts a token that contains information necessary for the system 150 to understand what object is being collected and what are the properties of such object. This token can then be passed to the system 150 via the network interface 160 using "pull" or "push" request approaches.

The object definition includes, at the very least, the type of object; for example, a pipe or a point. In further cases, the object definition can also include attributes or characteristics of the object. As an example, the object definition can include: a manhole 1.2 m wide and 3.2 m deep with grey cover installed in 1987 oriented 14d North. Generally, the definition can be as extensive or as simple as required to generate a visual representation.

At block 210, the display module 174 presents a visual representation to the user via the user interface 156, where the visual representation is associated with the selected object. The visual representation can be, for example, a three-dimensional (3D) digital-twin model resembling the collected object. In further cases, the visual representation can be, for example, a symbol representing the object, such as a point, a flag, a tag, or the like. In further cases, the visual representation can be, for example, a schematic representation, a raster image, or the like. In some cases, the type of visual representation can be associated with the object in the library; and in other cases, the type of visual representation can be selected by the user.

In some cases, along with the visual representation, other information can be displayed; for example, distance, elevation, size, shape, colours, and the like, can be displayed to assist with visualization and/or precise placement. In some cases, such as with GIS, the visual representation location can be represented by a single point, line, or outline, and to help the user understand where the object is placed, a point, a cross, a line, or other means, can be used within the visual representation.

Figure 5:
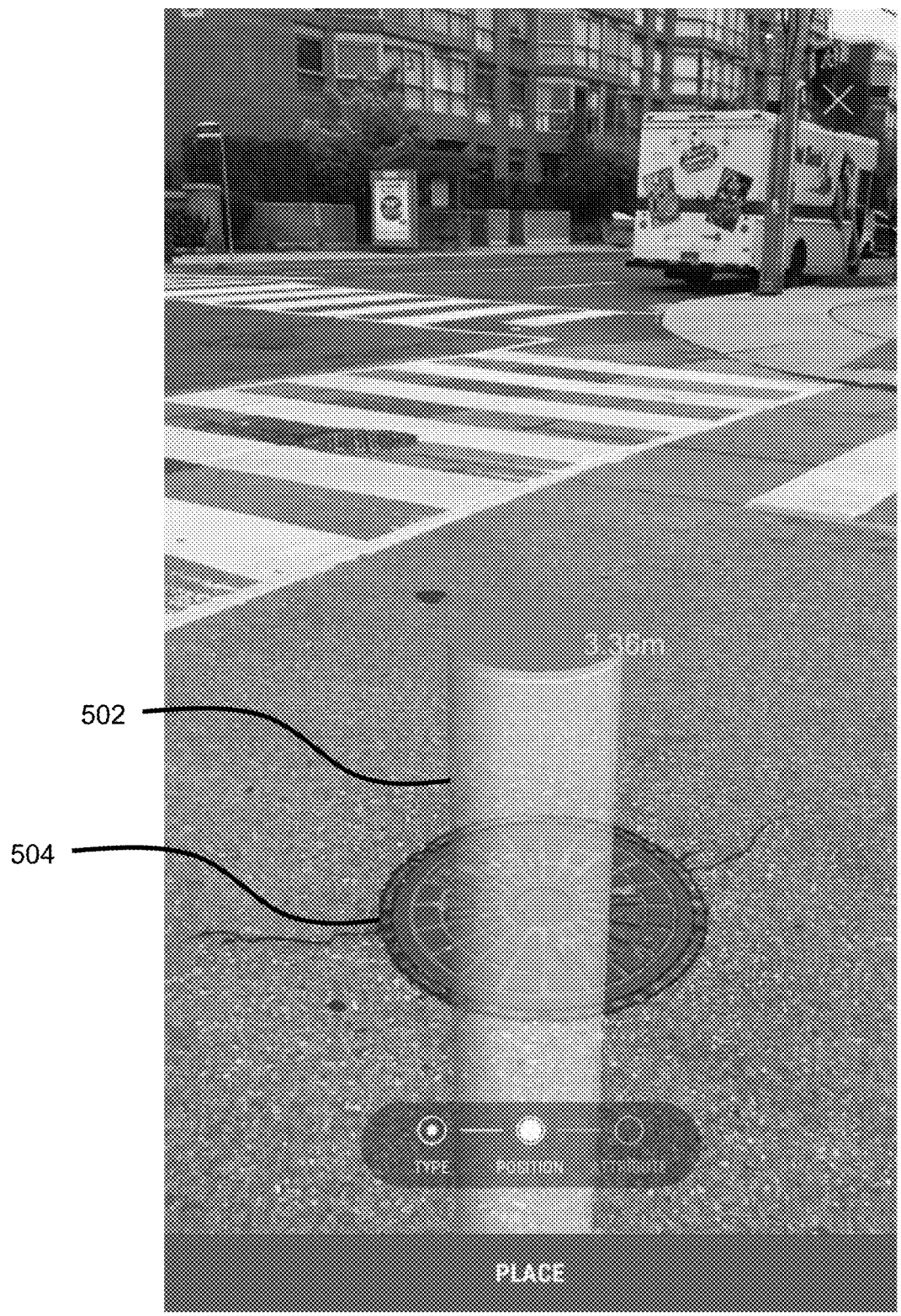
FIG. 5 illustrates an example screenshot of displaying a visual representation of an object over a captured scene, in accordance with the system of FIG. 1.

In other cases, the display module 174 can stream the visual representation (for example, a 3D model or model rendering) from a server, cloud-based infrastructure, or other external processing device. Instructions for such streaming can be provided in any suitable format (for example, KML or GeoJSON) or any other proprietary format. FIG. 5 illustrates an example screenshot of a visual representation 502 presented on the screen. In this example, the selected object 502 is a 3D model of a pipe. As illustrated, the background of the screen can be the mediated reality 'live' view received from the camera that is oriented in the direction of the system 150.

At block 212, the placement module 176 receives input from the user via the user interface 156 with respect to placement and associated aspects of the presented visual representation. Using the visual representation, the user can position the visual representation in space to align it with physical objects captured by the camera displayed in the background of the screen; for example, a physical counterpart of the object. The visual representation can be moved along the x or y or z axis, or along two (plain) or three (3D) axes at once. In some cases, the placement module 176 can receive elevation of the visual cue from the user moving the object along a vertical axis or moving the object in x, y, z space. In other cases, the placement module 176 can receive elevation defined in advance of placement, during placement, or after placement by the user. In some cases, objects that are defined as precise shapes, for example those used in engineering designs rather than simple points or lines, can rely on an outline, a bounding box, or 3D visuals to help the user align the visual representation with a physical object captured by the camera to capture not just the object position, but also its rotation.

In an example, the user input could include receiving two-finger input gestures on a touchscreen input device for tilting, rotating, moving, and/or sizing the visual representation relative to objects on the screen. In this example, the two-finger gestures can include moving the fingers closer or farther away from each other for sizing the visual representation, rotating the fingers relative to each other for rotation of the visual representation, moving one finger relative to a stationary finger for tilting of the visual representation, and moving the fingers together for moving of the visual representation. In further cases, variations or other suitable gestures can be used. In other examples, the user input can be received from any suitable input device, for example, hardware buttons, a mouse, a keyboard, or the like. In other examples, the user input can include moving of the system 150 itself captured by movement sensors such as accelerometers and gyroscopes. In other examples, the user input can include hands-free gestures. In other examples, the user input can include audible or spoken commands.

Figure 6:
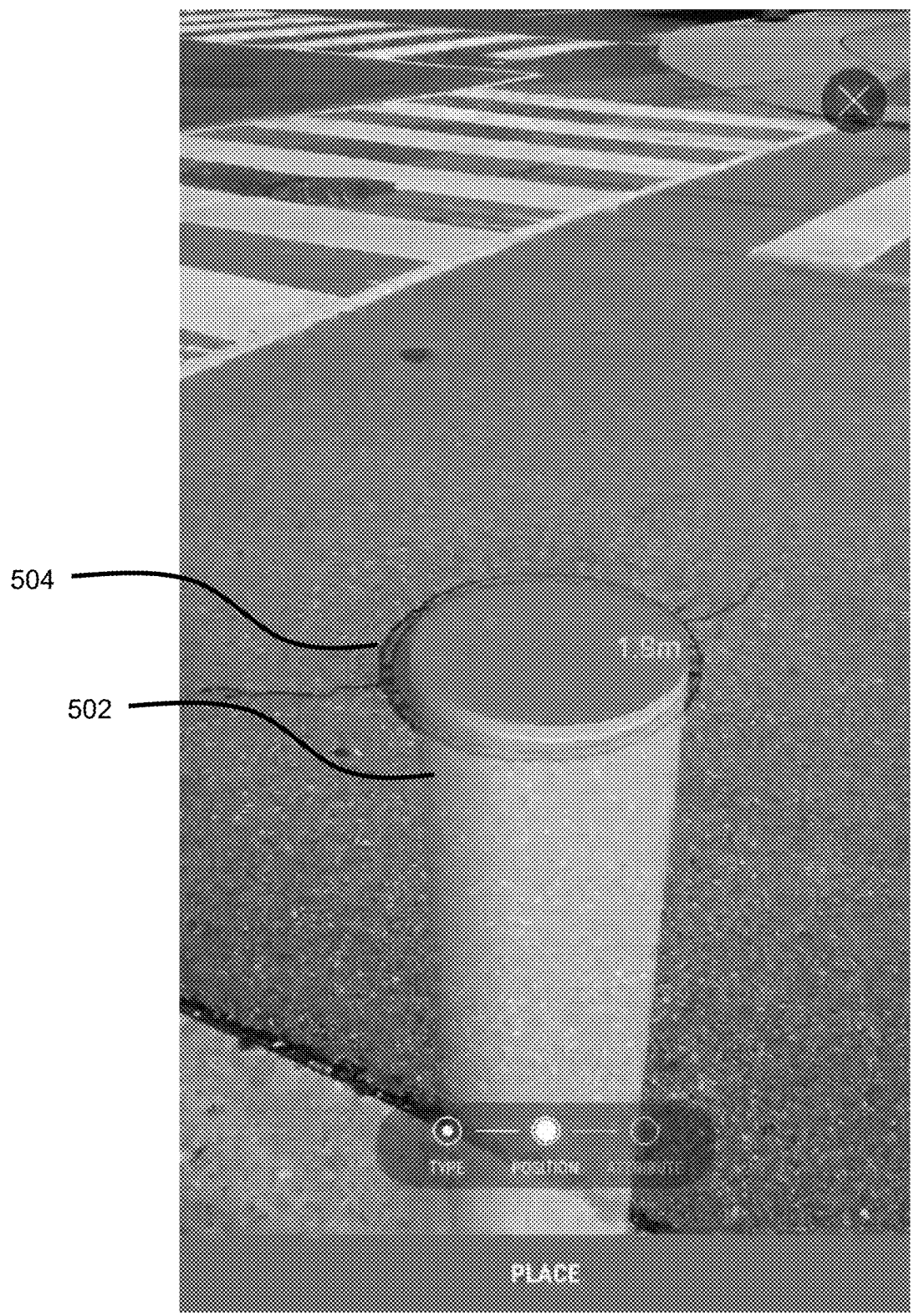
FIG. 6 illustrates an example screenshot of placing the visual representation of the object, in accordance with the system of FIG. 1.

FIG. 6 illustrates an example screenshot of the visual representation 502 presented on the screen in FIG. 5 after having been aligned with a manhole cover 504 in view of movement inputs received from the user. In this example, the visual representation 502 represents a manhole pipe aligned with, and located subsurface to, the manhole cover 504 captured by the camera.

In some cases, for example where the visual representation is anything other than a 3D model of the object (for example, a manhole symbolized by a point or a flag), a key location (for example, the point or the base of the symbol) can be placed at a respective key point of the physical object captured by the camera (for example, at the center of the manhole). In some cases, the symbology for each object, as well as the key locations and points, can be defined by each user.

In further cases, the placement module 176 can determine the actual object placement based on the object shape without providing any visual representations about the actual point location to the user. For example, a manhole can have an inferred location at the geometric center of the manhole cover. By aligning the virtual representation of the manhole cover with the physical object, the placement module 176 can determine that the center of it as at the object location.

In some cases, the placement module 176 can "snap" the visual representation to a physical object captured by the camera. In this way, placement module 176 can set the correct location, elevation, and size of the visual cue to the real counterpart object (for example, in the example of FIG. 6, snapping the diameter of the pipe to the diameter of the manhole). In a particular case, the snapping can be accomplished via machine vision techniques. In an example, the machine vision can recognize an object in the scene captured by the camera and recognize necessary environmental variables; for example, grade, distance, object size, and the like. These environmental variables can be coupled with information coming from topographical maps or built-in surface scanning capabilities; for instance, to increase accuracy. The machine vision technique can position a visual representation of the object relative to the object captured by the camera. In an example, the relative positioning can be based on matching a geometric center and/or edges of the visual representation with the object captured by the camera. In some cases, the visual representation can be auto-sized to match the object captured by the camera. In some cases, display of the visual representation can be maintained in the same geospatial location as the corresponding physical object to create an illusion that it is "glued" or "snapped" to the physical object.

In some cases, once the placement module 176 receives input from the user with respect to placement of the visual representation, the visual representation can be temporarily fixed in place so that the user can look at it from different angles to confirm the location.

In some cases, since topography and elevation of the area captured by the camera can distort accuracy (for example, objects that are deeper may appear closer instead), the display module 174 can display projected distance to an object captured by the camera to assist the user in placing the visual representation on the screen with higher accuracy. In some cases, as described herein, distance finders can be used to determine the distance to the object; for example, to ensure survey-grade data collection.

At block 214, the recordation module 178 records the position of the presented visual representation anchored into the physical space; for example, the visual representation's latitude, longitude, and elevation. In some cases, the recordation module 178 can use machine vision and/or machine learning techniques to determine the correlation between the position of the visual representation presented on the screen and a corresponding actual position in physical space. In some cases, the recordation module 178 can also record other properties of the presented visual representation; for example, size and height. The recordation can include storing the type of object, its position, and/or its properties in a geospatial data storage, such as on the database 166 or sent to an external storage via the network interface 160. In a particular case, the position and the orientation of the system 150 determined by the position module 172 is used to coordinate an on-screen location with a geospatial position.

Figure 7:
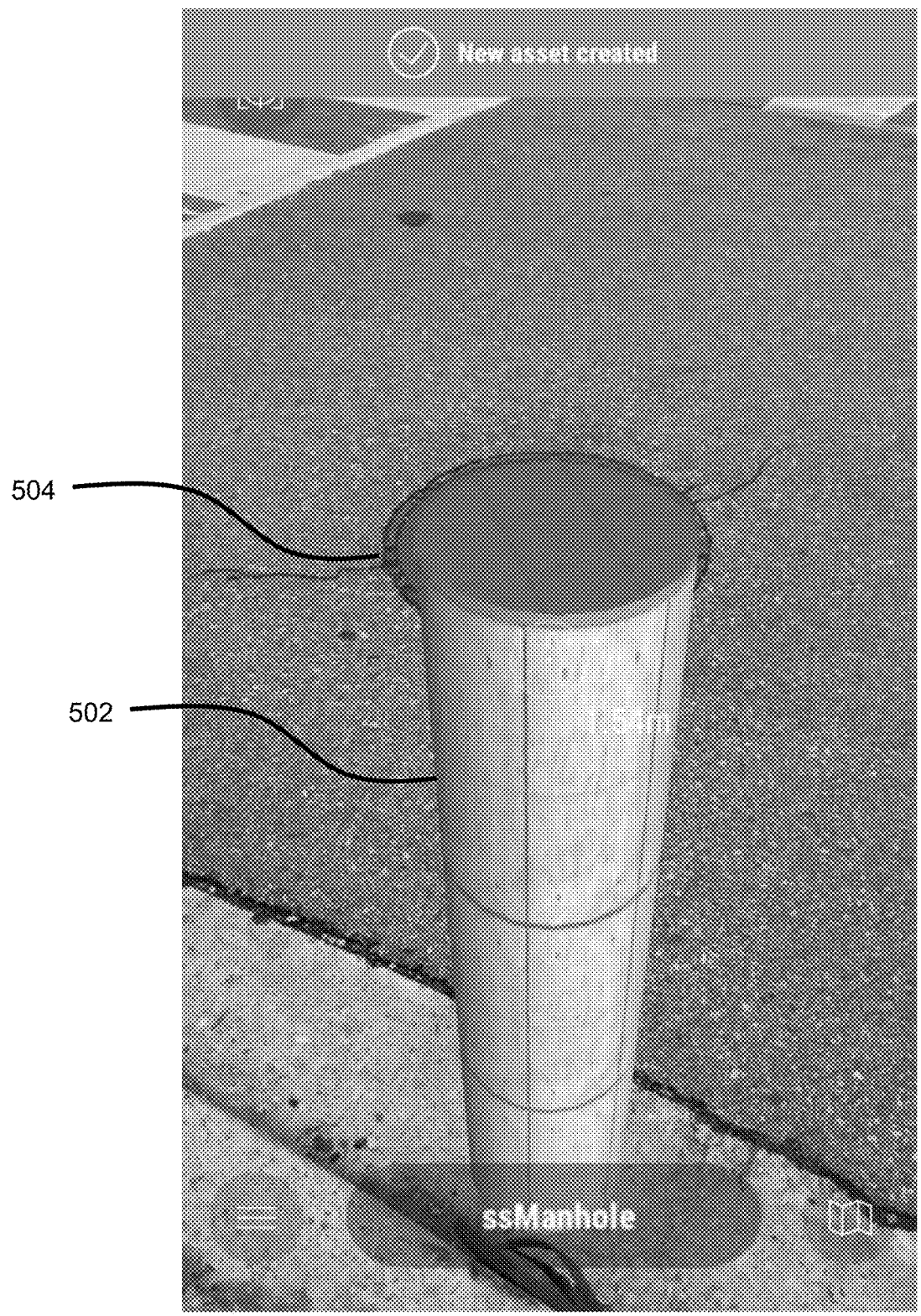
FIG. 7 illustrates an example screenshot after recordation of placement of the visual representation of the object, in accordance with the system of FIG. 1.

In some cases, the position of the object represented by the visual representation can be accurately determined, by the position module 172, by using the position of the system 150 (for example, its latitude, longitude, and elevation), an azimuth of the system 150, and the distance to one or more objects captured by the camera. In some cases, during recordation, the position module 172 can capture metadata from the GNSS and/or RTK device, and then correct it for the elevation and distance difference between the GNSS antenna and the presented visual representation to achieve survey-grade data accuracy. In some cases, the user can update the position and/or the properties of the visual representation manually. FIG. 7 illustrates an example screenshot of the visual representation 502 of FIG. 5 after recordation.

In an example, when the position module 172 determines the system's 150 location and orientation in x,y,z space, the position module 172 also determines the position and orientation of the physical camera (x,y,z plus bearing). The display module 174 can use the positioning information to access spatial data (the data with x,y,z coordinates) and create (or use an existing) visual representation (for example, a 3D model). The display module 174 can place the virtual camera in the location of the physical camera (x,y,z plus bearing) relative to the visual representation. The visual representation can be overlaid on top of the physical representation such that it can appear in the correct location, matching physical objects around it. In this way, by understanding x,y,z and orientation of the physical camera, the display module 174 can display visual representations of objects that are in the scene (or field of view), and size and orient the visual representation to allow for visualization that matches the physical world accurately.

In some cases, latitude and longitude of the physical object can be determined based on the distance difference between a projection of the visual representation in the physical space and the corresponding physical object. The recordation module 178 can make this determination because the system 150 is capable of identifying and tracking its location (for example, latitude and longitude) and orientation in space. In some cases, the system 150 can track its elevation based on absolute or relative elevation models. By factoring in the distance between the physical object and the location and orientation of the visual representation, the latitude and longitude of the physical object can be determined. In an example, the recordation module 178 can use a Euclidean distance determination to determine the physical position of the visual representation of the object in the physical space, knowing the physical position of the system 150 and the direction and distance of the physical object.

In some cases, the recordation module 178 can record position and/or elevation in conjunction with a distance finder device as a computing device 190. In this way, the recordation module 178 can measure the exact distance to objects captured by the camera. The distance finder device can include, for example, a laser distance finder, sonic distance finder, optical distance finder, depth cameras, 3D cameras, spatial sensors, gyroscopes, accelerometers, time of flight sensors, or optical distance recognition using triangulation from multiple cameras to determine distance. In some cases, the distance finder can be used in combination with machine vision and/or artificial intelligence techniques to determine physical landscape properties and/or aspects of physical objects in the captured scene (for example, object type, elevation, size, shape, color and/or condition). In this way, the visual representation can be automatically sized and/or positioned relative to the image captured by the camera based on the landscape properties and aspects of physical objects in the captured scene. In some cases, the recordation module 178 can access stored information about landscape properties and/or aspects of physical objects in the captured scene.

In some cases, to ensure accurate object placement, several approaches can be used. A distance to a physical object can be measured using distance finders. The distance finder may also detect the object's elevation (either relative or absolute). Examples of other distance determination approaches can include optical tools, such as depth cameras or time-of-flight sensor, or image processing that compares images taken from multiple locations or angles to determine distances. These other approaches can be used separately, or they can be connected or associated with the system 150 to provide information automatically. For example, the display module 174 may display cross-hairs and, upon aligning the cross-hairs with the physical object, the system 150 can send a request to a distance finder to determine the distance to that point. In another example, the user interface 156 can receive an indication from the user of a point they want to measure the distance to. In another example, an external distance finder can be used to determine the distance to the physical object separately, and that distance can be used to ensure accurate object placement by displaying the distance to the collected object.

In some cases, machine vision (MV) and/or artificial intelligence (AI) can be used. MV and AI techniques can be used to automatically detect physical objects captured by the camera, then determine a distance to the object. Additionally, the MV and AI techniques can be used to identify elevation, size, rotation, object conditions (e.g., rust or damages), and other parameters of the object. In some cases, using MV and AI techniques, some aspects of method 200 can be combined and/or automated (for example, automated object detection can select the correct object definition from the library or generate the object definition in real-time, then generate the visual representation, and auto-align it with the physical object). In these cases, the user can be displayed the visual representation aligned with the physical object.

In some cases, uneven terrains, such as sharply sloping driveways or highway ramps or hills, can introduce visual distortions that may lead to misleading results. To account for the terrain irregularities, various approaches can be used. For example, incorporating local topographical maps, using surface scanning, receiving distances from a distance finder, or other approaches to construct terrain outlines or determine the object elevation. As described herein, to assist the user with the accurate placement of the visual representation, instead of manipulating the object using a flat plain, in some cases the object can be moved in a 3D space (x, y and z coordinates) either in a single step or as separate distinct steps (for example, horizontal placement being separate from the vertical elevation adjustments).

In some cases, to accommodate survey-grade data collection requirements, the position module 172 can capture GNSS and/or RTK information when the user has verified placement of the visual representation of the object. The GNSS and/or RTK information can be used to determine the distance from the system 150 and the physical object. Generally, the information provided by GNSS and/or RTK contains latitude and longitude information. It can also contain elevation data and supplementary metadata that can include satellite constellation used, corrections applied, and other components required for survey-grade data collection. Combined with the distance to the object and the object elevation, GNSS and/or RTK information can be stored as part of the collected object metadata, ensuring that the object was collected within the accuracy parameters.

In some cases, the recordation module 178 can also perform complementary attribute collection via the user interface 156 and store it as metadata associated with the collected object. The user may enter additional information about the collected object by, for example, manually entering information, selecting values from drop-down menus, validating prepopulated fields, and the like. This additional information can include, for example, elements such as colour, material type, shape, installation date, and the like. In some cases, the system can also automatically capture complementary attributes, for example, date of the data collection, person who performed the collection, equipment used, and the like. In some cases, these complementary attributes can be determined using MV and/or AI.

In some cases, the system 150 can be initiated from an external system that provides instructions to begin. Examples of such external systems can include ticket management or spatial tracking systems. In an example, a technician may be reviewing a work ticket using a third-party ticket management system, and as part of the ticket workflow, the system may launch the system 150 for the technician to complete the assignment. In another example, a technician may be passing through an area for which they will need to collect spatial information. Upon detecting the technician's location, a third-party process may notify the worker about the assignment and automatically launch the system 150.

In an example use case of the present embodiments, a technician at a construction site may use the system 150 to visualize surrounding infrastructure. Upon discovering a missing object from the geospatial dataset, the technician can use the system 150 to add this object to the geospatial dataset.

Advantageously, the present embodiments can provide real-time visual validation of object placement in 3D space while capturing critical spatial data (latitude, longitude and elevation). In this way, the recorded geospatial data of the object can be used later for construction, analytical determinations, and other purposes. Instead of performing the exhaustive, expensive, and time-consuming task of taking measurements with multiple devices and then validating the data collection accuracy using 2D maps, additional measurements, and models, the user can easily monitor and verify where an object is placed in real-time to maintain and improve geospatial database accuracy.

Advantageously, the present embodiments can speed up data collection and increase safety of field-service workers since they no longer need to "tap" individual objects. Also advantageously, the present embodiments can substantially reduce the cost of data collection by reducing the time needed for data capture, quality control, and additional equipment requirements.

While the forgoing refers to a camera to capture a physical scene and a screen to display the mixture of physical and visual representations, it is contemplated that any apparatus for blending virtual and real objects can be used; for example, a holographic system that displays holographic augmentation or projects holograms.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method of collecting geospatial object data with mediated reality, the method comprising:
   receiving a determined physical position, the determined physical position comprising one or more of latitude, longitude, elevation, and bearing, the physical position received from at least one member of a group consisting of global navigation satellite systems (GNSS), real-time kinematic (RTK) positioning, manual calibration, vGIS calibration, and markers;
   receiving a geospatial object to be collected;
   presenting a visual representation of the geospatial object to a user relative to a physical scene;
   receiving a placement of the visual representation relative to the physical scene; and
   recording the position of the visual representation anchored into a physical position in the physical scene using the determined physical position.

2. The method of claim 1, wherein the physical scene comprises a counterpart geospatial object to the geospatial object, and wherein receiving placement of the visual representation comprises placing the visual representation at a location of the counterpart geospatial object in the physical scene.

3. The method of claim 2, wherein receiving a placement of the visual representation comprises receiving one or more inputs from a user each representing at least one of moving the visual representation, rotating the visual representation, tilting the visual representation, and sizing the visual representation.

4. The method of claim 2, wherein placing the visual representation at the location of the counterpart geospatial object in the physical scene comprises using machine vision and artificial intelligence techniques to locate the counterpart geospatial object in the physical scene and place the visual representation at such location.

5. The method of claim 1, wherein recording the position of the visual representation anchored into the physical position in the physical scene comprises using the latitude, the longitude, and the elevation of the determined physical position, a determined azimuth, and a distance to a geospatial object in the physical scene.

6. The method of claim 5, wherein the distance to the geospatial object in the physical scene comprises receiving a distance measurement from a distance finder device.

7. The method of claim 5, wherein using the latitude, the longitude, and the elevation of the determined physical position comprises capturing metadata from at least one of global navigation satellite systems (GNSS) and real-time kinematic (RTK), and correcting the difference in distance between the metadata and the position of the visual representation.

8. The method of claim 1, wherein recording the position of the visual representation anchored into the physical position in the physical scene further comprises recording at least one of the size, height, and orientation of the visual representation of the geospatial object.

9. A system of collecting geospatial object data with mediated reality, the system comprising one or more processors and data storage memory in communication with the one or more processors, the one or more processors configured to execute:
   a position module to receive a determined physical position from a spatial sensor, the determined physical position comprising one or more of latitude, longitude, elevation, and bearing the physical position received from at least one member of a group consisting of global navigation satellite systems (GNSS), real-time kinematic (RTK) positioning, manual calibration, vGIS calibration, and markers;
   an object module to receive a geospatial object to be collected;
   a display module to present, to a display device, a visual representation of the geospatial object relative to a physical scene;
   a placement module to receive a placement of the visual representation relative to the physical scene; and
   a recordation module to record the position of the visual representation anchored into a physical position in the physical scene using the determined physical position.

10. The system of claim 9, wherein the physical scene comprises a counterpart geospatial object to the geospatial object, and wherein receiving placement of the visual representation comprises placing the visual representation at a location of the counterpart geospatial object in the physical scene.

11. The system of claim 10, wherein receiving a placement of the visual representation comprises receiving one or more inputs from a user from an input device, where each input represents at least one of moving the visual representation, rotating the visual representation, tilting the visual representation, and sizing the visual representation.

12. The system of claim 10, wherein placing the visual representation at the location of the counterpart geospatial object in the physical scene comprises using machine vision and artificial intelligence techniques to locate the counterpart geospatial object in the physical scene and place the visual representation at such location.

13. The system of claim 6, wherein recording the position of the visual representation anchored into the physical position in the physical scene comprises using the latitude, the longitude, and the elevation of the determined physical position, a determined azimuth, and a distance to a geospatial object in the physical scene.

14. The system of claim 13, wherein the distance to the geospatial object in the physical scene comprises receiving a distance measurement from a distance finder device.

15. The system of claim 13, wherein using the latitude, the longitude, and the elevation of the determined physical position comprises capturing metadata from at least one of global navigation satellite systems (GNSS) and real-time kinematic (RTK), and correcting the difference in distance between the metadata and the position of the visual representation.

\* \* \* \* \*